United States Patent [19]

Bissonnette

[11] Patent Number: 5,383,650
[45] Date of Patent: Jan. 24, 1995

[54] GAS FLOW CONTROL ASSEMBLY FOR A GAS-SAVING OXY/FUEL CUTTING TORCH

[76] Inventor: Claude Bissonnette, 232 11th St. W., Cornwall, Ontario, Canada, K6H 3B2

[21] Appl. No.: 191,668

[22] Filed: Feb. 4, 1994

[51] Int. Cl.$^6$ ............................................. B23K 7/00
[52] U.S. Cl. ........................................ 266/48; 266/74
[58] Field of Search ................... 266/48, 74; 148/196, 148/194; 239/390, 397, 398, 414, 419

[56] References Cited

U.S. PATENT DOCUMENTS

| | | | |
|---|---|---|---|
| 1,288,879 | 12/1918 | Harris | 266/48 |
| 3,891,195 | 6/1975 | Mills, Jr. et al. | 266/48 |
| 3,923,448 | 12/1975 | Guth | 431/354 |
| 3,948,496 | 4/1976 | Miller | 266/48 |
| 4,147,333 | 4/1979 | Wirth | 266/48 |
| 4,443,003 | 4/1984 | Bleys | 266/48 |
| 4,455,176 | 6/1984 | Fuhrhop | 149/9 R |
| 4,760,994 | 8/1988 | Ferguson | 266/74 |
| 4,915,360 | 4/1990 | Goulet et al. | 266/48 |
| 5,120,026 | 6/1992 | Bissonnette | 266/48 |
| 5,308,042 | 5/1994 | Lotz et al. | 266/48 |

*Primary Examiner*—Scott Kastler
*Attorney, Agent, or Firm*—Pearne, Gordon, McCoy & Granger

[57] ABSTRACT

A novel gas flow control assembly for a gas fuel cutting torch is disclosed. The gas flow control assembly provides a gas-saving oxy/fuel cutting torch which may be operated in a pilot mode when the torch is not in active use. The gas flow control assembly includes an inlet end and an outlet end. The inlet end is adapted for the attachment of a fuel gas conduit and an oxygen conduit. The outlet end is adapted for the attachment of a fuel gas tube, a preheat oxygen tube and a cutting oxygen tube which provide fluid communication of fuel gas, preheat oxygen and cutting oxygen from the control body to a torch head. Passages through the control body are normally closed by biased valves having stems which extend through fluid tight seals in a top of the control body. A lever pivotally connected to the control body is arranged to simultaneously depress the stems of the valves which normally close the preheat oxygen and the fuel gas passages when the lever is manually operated to a first position. Further operation of the lever depresses the stem of the valve which normally closes the cutting oxygen passage. A small orifice, preferably bored through each of the valves in the preheat oxygen and the fuel gas passages permits a controlled flow of fuel and oxygen gases through the gas flow control assembly to permit the torch to operate in the pilot mode wherein a small flame is sustained at a nozzle installed in the torch head. The advantage is that a cutting torch is provided which saves significant quantities of fuel gas and oxygen because it may be instantly switched between pilot mode and preheat/cutting mode.

37 Claims, 3 Drawing Sheets

GAS FLOW CONTROL ASSEMBLY FOR A GAS-SAVING OXY/FUEL CUTTING TORCH

FIELD OF THE INVENTION

The present invention relates to cutting torches and in particular to a gas flow control assembly for a gas-saving cutting torch that operates in a pilot mode when not in use for actively preheating or cutting metal.

BACKGROUND OF THE INVENTION

Cutting torches are commonly used for cutting metal by locally heating the metal to its oxygen ignition temperature with a preheat flame fuelled by an oxygen/fuel gas mixture and subsequently cutting the metal with a high velocity cutting oxygen stream supplied through the torch, thereby releasing a considerable amount of thermal energy which further heats the surrounding metal. The high velocity oxygen stream physically removes the molten material by oxidation, thereby cutting the metal.

Cutting torches are generally recognized to be one of the most efficient methods of cutting metal. In industrial processes for cutting slab steel at a casting or rolling mill and the like, cutting torches are often operated continuously. Such torches are occasionally damaged or subject to blowout. Because industrial processes of this type cannot be halted to replace or repair torch equipment, a standby torch is generally kept lit and operating around the clock so that it can be used if the primary torch fails. The continual operation of a standby torch consumes large quantities of cutting gas and compressed oxygen.

In other metal cutting applications using gas fuelled cutting torches, the cutting torch is often used sporadically while material marking, placement, or other arrangements of material or personnel are in progress. Shutting off a cutting torch for short periods of time between cutting jobs is inefficient. Consequently, the cutting torch may consume significant quantities of fuel and compressed oxygen between cuts.

It is therefore desirable to provide a gas flow control assembly for a gas fuelled cutting torch that provides a cutting torch which will operate in a pilot mode wherein a small flame is sustained at a cutting nozzle installed in the torch head when the torch is not in active use, and will instantly shift to a fully-tuned preheat cutting/mode on demand.

SUMMARY OF THE INVENTION

Thus, in accordance with the invention there is provided a gas flow control assembly for a gas fuelled cutting torch, comprising:
- a control body adapted to receive oxygen and fuel gas from separate sources and controllably meter the oxygen and fuel gas to a cutting torch head, the control body including flow control valves for respectively controlling a flow of fuel gas, preheat oxygen and cutting oxygen to the cutting torch head, each valve being biased to a normally closed position;
- means for operating the flow control valves to open the valves in a specific sequence such that the valves for controlling the flow of fuel gas and preheat oxygen are opened substantially simultaneously, while the valve for controlling the flow of cutting oxygen is opened only after the fuel gas and the preheat oxygen valves are opened;
- means for providing flow paths to bypass the flow control valve for fuel gas and the flow control valve for preheat oxygen so that fuel gas and preheat oxygen are supplied to the cutting torch head when the valves are closed to sustain a pilot flame at a cutting nozzle mounted therein; and
- shutoff valves for selectively inhibiting a flow of fuel gas and preheat oxygen to the cutting torch head and for regulating the flow of fuel gas and preheat oxygen to the cutting torch head when the flow control valves are open.

In accordance with a further aspect of the invention there is provided an oxy/fuel cutting torch, comprising:
- control valves for respectively controlling a flow of fuel gas, preheat oxygen and cutting oxygen to a torch head of the cutting torch, each control valve being biased to a normally closed position;
- means for operating the control valves to open the valves in a specific sequence such that the control valves for controlling the flow of fuel gas and preheat oxygen are opened substantially simultaneously, while the control valve for controlling the flow of cutting oxygen is opened after the fuel gas and the preheat oxygen valves are opened;
- means for providing flow paths to bypass the control valve for fuel gas and the control valve for preheat oxygen so that fuel gas and preheat oxygen are supplied to the torch head when the control valves are closed, in order to sustain a pilot flame at a cutting nozzle mounted in the torch head; and
- shutoff valves for selectively inhibiting a flow of fuel gas and preheat oxygen to the torch head and for regulating the flow of the gas and preheat oxygen to the cutting torch head when the control valves are open.

The gas flow control assembly in accordance with the invention therefore includes a control body which has an inlet end and an outlet end. The inlet end is provided with bores for attaching a fuel gas supply line and a compressed oxygen supply line. The outlet end of the control body is provided with bores which sealingly receive metal tubes for conducting fuel gas, preheat oxygen and cutting oxygen to a torch head which is adapted to receive a cutting nozzle. The cutting nozzle may be a premix or a postmix cutting nozzle.

The control body includes passages that extend through the body from the inlet end to the outlet end and respectively connect the fuel gas supply line with the fuel gas tube, the oxygen supply line with the preheat oxygen tube and the cutting oxygen tube. Each passageway is normally closed by a spring biased valve that includes a stem which projects through a fluid tight seal in a top of the control body. The flow control valves for the fuel gas and the preheat oxygen are preferably aligned in a transverse plane of the control body so that a lever mounted to the control body will exert mechanical pressure on the respective stems when depressed and open the two valves together to permit preheat oxygen and fuel gas to be supplied to the torch head simultaneously. The cutting oxygen valve stem is preferably spaced away from the plane of the preheat oxygen and fuel gas valve stems so that the lever must be further depressed in order to release a flow of cutting oxygen through the torch.

In addition, means are provided to permit a metered flow of preheat oxygen and fuel gas around the respective biased valves so that the torch can operate in a pilot mode wherein a small flame is sustained at a cutting tip installed in the torch head while the spring biased preheat oxygen and the fuel gas valves are closed. The preferred means for permitting a metered amount of gas to flow past the respective spring biased valves is a small diameter bore drilled through the valve bodies and a short distance axially into the valve stems. At least one small radial bore in the valve stem communicates with the axial bore to provide a path for the metered flow of fuel gas and oxygen to permit the torch to operate in the pilot mode.

Shutoff valves are also located in each of the fuel gas and the preheat oxygen passages. The shutoff valves permit those passages to be closed when it is desirable to terminate the pilot mode operation of the torch. The shutoff valves also permit the regulation of gas flow through the preheat oxygen and the fuel gas passage so that the gas flow to the cutting nozzle can be regulated to provide an optimum preheat flame in accordance with the requirements of the nozzle and the cutting job.

In accordance with a further aspect of the invention, there is provided a gas-saving cutting torch which includes a gas flow control assembly in accordance with the invention to permit the torch to operate in a gas-saving pilot mode when the torch is not in active use.

It is an object of the invention to provide a gas flow control assembly for a gas fuelled cutting torch which permits the assembly of an efficient, gas-saving cutting torch.

It is a further object of the invention to provide a gas fuelled cutting torch which may be operated in a pilot mode to save fuel gas and compressed oxygen.

It is yet a further object of the invention to provide a gas-saving cutting torch which is adapted to operate with either of a premix type cutting nozzle or a postmix type cutting nozzle.

It is yet another object of the invention to provide a gas-saving cutting torch that can be operated in a pilot mode when the torch is not in active use and instantly shifted to a fully-tuned preheat/cutting mode when required.

BRIEF DESCRIPTION OF THE DRAWINGS

The invention will now be further explained by way of example only and with reference to the following drawings, wherein.

DETAILED DESCRIPTION OF THE PREFERRED EMBODIMENTS

Figure 1:
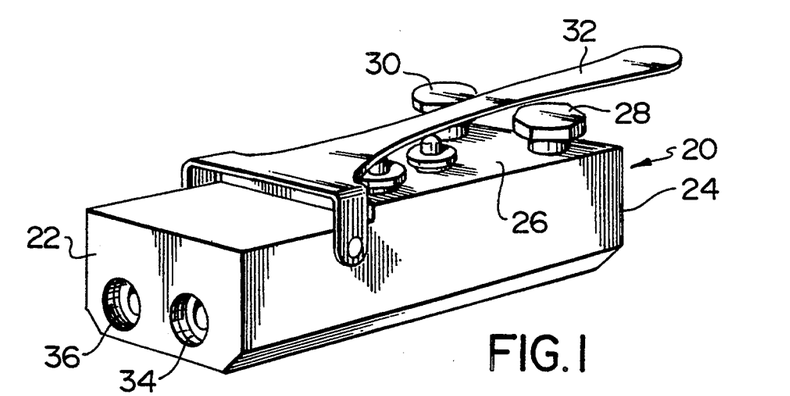
FIG. 1 is a perspective view of the gas flow control assembly for a gassaving oxy/fuel cutting torch in accordance with the invention, as seen from an inlet end of the assembly.

FIG. 1 shows a perspective view from the inlet end of a gas flow control assembly in accordance with the invention, generally referred to by reference 20. The gas flow control assembly 20 includes an inlet end 22, an outlet end 24 and a top surface 26. The top surface 26 includes a preheat oxygen shutoff valve 28 and a fuel gas shutoff valve 30, the function of which will be explained in relation to FIGS. 3 and 5, respectively. The gas flow control assembly 20 also includes a control lever 32, the function of which will also be explained with reference to FIGS. 3, 5 and 10. The inlet end 22 of the gas flow control assembly 20 includes an oxygen inlet 34 and a fuel gas inlet 36. Each inlet accommodates standard connectors (not shown) provided on flexible compressed gas hoses, well known in the art. The connectors may be threaded connectors, or soldered connectors which are commonly used for industrial and commercial cutting torches.

Figure 2:
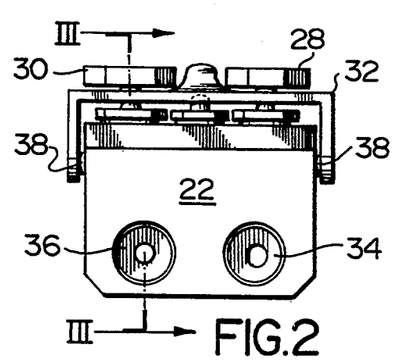
FIG. 2 is an end elevational view of the inlet end of the gas flow control assembly shown in FIG. 1.

FIG. 2 shows an end elevational view of the inlet end 22 of the gas flow control assembly shown in FIG. 1. As is apparent in this view, the control lever 32 pivots about a pair of hinge pins 38 received in bores (not shown) on opposite side surfaces of the gas flow control assembly 20.

Figure 3:
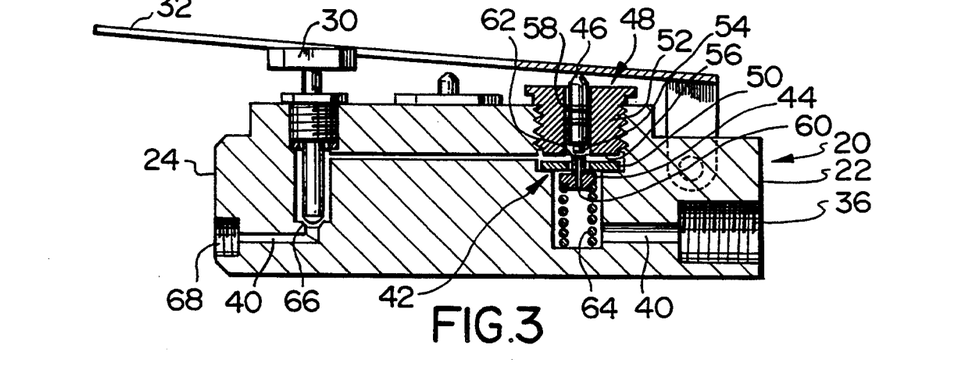
FIG. 3 is a longitudinal cross-sectional view taken along lines III—III of FIG. 2.

FIG. 3 shows a longitudinal cross-sectional view of the gas flow control assembly 20 taken along lines III—III of FIG. 2. The fuel gas inlet 36 is connected to a fuel gas outlet 68 by a fuel gas passage 40. The fuel gas passage 40 includes a flow control valve, generally referred to by reference 42, for manually controlling a flow of fuel gas through the gas flow control assembly 20, as will be explained in greater detail with reference to FIG. 10. The flow control valve 42 includes a valve body 44 and a valve seat assembly, generally referred to by reference 48. The valve seat assembly 48 includes a valve seat 50 which is retained in a threaded bore by a valve seat retainer nut 52. The valve seat retainer nut 52 is pierced by an axial bore 54 which accommodates a valve stem 46 that extends through the axial bore 54. O-rings 58 ensure a fluid tight seal between the valve stem 46 and the valve seat retainer nut 52. The valve body 44 is held in fluid tight relationship with the valve seat 50 by a valve spring 64, preferably a coil spring arranged in a manner well known in the art. Radial bores 56 in the valve seat retainer nut 52 communicate with the fuel gas passage 40 to permit fuel gas to move freely past the valve seat retainer nut 52. The number of radial bores 56 is optional but the combined cross-sectional area of the bores should be adequate to supply the maximum amount of fuel gas required by a cutting torch to be assembled using the gas flow control assembly 20.

When the valve body 44 is in a closed, fluid tight relationship against the valve seat 50, fuel gas flow through the torch is prevented unless a restricted flow path that bypasses the valve is provided. It is desirable to provide such a flow path so that the torch will operate in a gas-saving pilot mode when not in active use. The preferred flow path for a restricted flow of fuel gas through the gas flow control assembly 20 when the flow control valve 42 is closed is an axial pilot bore 60 which pierces the valve body and a lower portion of the valve stem 46. One or more radial pilot bores 62 communicate with the axial pilot bore 60 to permit a metered flow of fuel gas to bypass the valve body 44 and permit a torch to be operated in a pilot mode. Other arrangements for providing a metered flow of gas to bypass the flow control valve 42 are possible. For example, a bore (not illustrated) through the body of the gas flow control assembly 20 to permit a restricted flow of fuel gas to bypass the flow control valve 42 could be used as an alternate arrangement. Gas flow through the bore is preferably adjustably controlled by a set screw (not illustrated) or a needle valve (not illustrated) that is adapted to close the bore and is provided with a gas impervious seal, well known in the art, to prevent gas from escaping from the bore around the set screw or needle valve. A specially constructed "leaky" valve seat (not illustrated) could also be substituted for the bores 60, 62 in the valves 42, 80 shown in FIGS. 3 and 5, respectively. The preferred arrangement is, nonetheless, the axial and radial pilot bores 60, 62 shown in FIGS. 3 and 5 since such bores are readily machined at minimal expense and permit a torch to be quickly and inexpensively adjusted to a different pilot gas flow rate should operating conditions dictate. Such adjustment is accomplished by replacing the flow control valves 42, 80 with a valve having axial and radial pilot bores 60, 62 of a different diameter.

Since a metered flow of fuel gas continually bypasses the flow control valve 42, a fuel gas shutoff valve 30 is necessary in order to close the fuel gas passage 40 when a torch is not in use. The fuel gas shutoff valve 30 also permits the adjustment of the fuel gas supply when the flow control valve 42 is opened, as will be explained in detail with reference to FIG. 10. The fuel gas shutoff valve 30 operates in a manner well known in the art and closes against a fuel gas shutoff valve seat 66 in a manner well understood.

Figure 4:
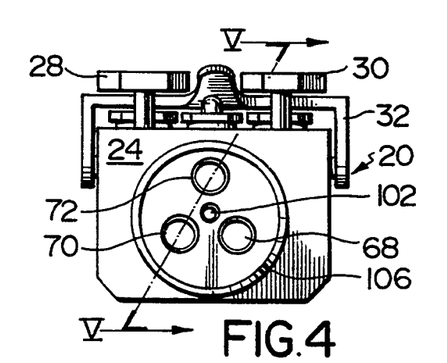
FIG. 4 is an end elevational view of an outlet end of the gas flow control assembly shown in FIG. 1.

FIG. 4 shows an end elevational view of the outlet end 24 of the gas flow control assembly 20. The outlet end 24 of the gas flow control assembly includes three outlet orifices, the fuel gas outlet 68, a preheat oxygen outlet 70 and a cutting oxygen outlet 72.

Figure 5:
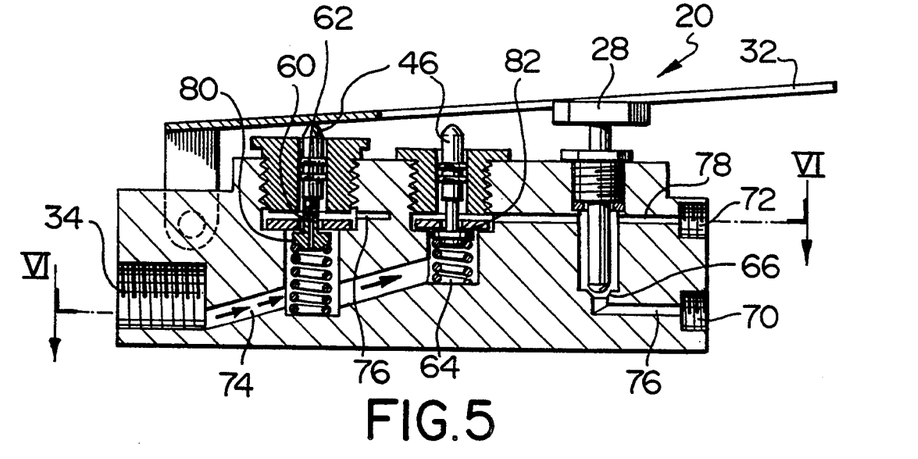
FIG. 5 is a longitudinal cross-sectional view taken along lines V—V of FIG. 4.

FIG. 5 shows a longitudinal cross-sectional view taken along line V—V of FIG. 4. In this embodiment of the invention, a single oxygen inlet 34 is provided. The single oxygen inlet 34 supplies both the cutting oxygen outlet 72 and the preheat oxygen outlet 70. Experimentation has shown that a single oxygen inlet is adequate to supply both outlets. It is possible, nonetheless, to provide two oxygen inlets (second inlet not illustrated) to supply the preheat oxygen and the cutting oxygen, respectively.

Figure 6:
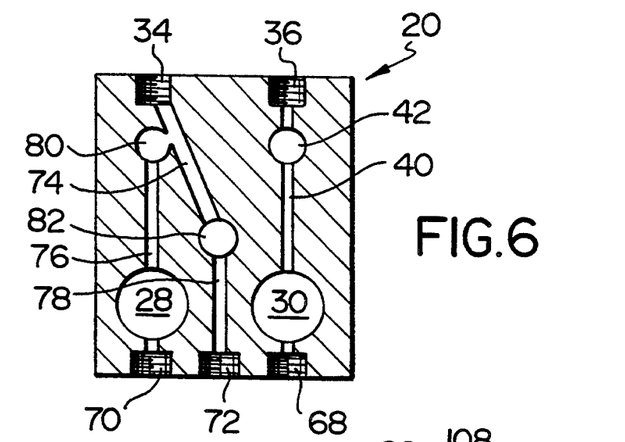
FIG. 6 is a schematic longitudinal cross-sectional view of the gas flow control assembly taken along line VI—VI of FIG. 5, showing the passages which connect the inlet end and the outlet end of the gas flow control assembly.

An oxygen supply passage 74 supplies two flow control valves 80, 82 which respectively control the flow of preheat oxygen to preheat oxygen outlet 70 and the flow of cutting oxygen to cutting oxygen outlet 72. A preheat oxygen control valve 80 controls the flow of preheat oxygen to a preheat oxygen passage 76. Only a portion of preheat oxygen passage 76 may be seen in FIG. 5. The layout of each passage through the gas flow control assembly 20 is shown in FIG. 6. The preheat oxygen control valve 80 is constructed exactly like the flow control valve 42 for preheat gas. An axial pilot bore 60 and a radial pilot bore 62 supply a metered flow of preheat oxygen to the torch head whenever a preheat oxygen shutoff valve 28 is open.

Flow control for cutting oxygen is controlled by a cutting oxygen control valve 82 which is likewise constructed the same as the control valve 42, with the exception that the cutting oxygen control valve is not pierced by an axial pilot bore or any radial pilot bores. Therefore, cutting oxygen does not flow through cutting oxygen passage 78 unless the lever 32 is depressed far enough to open the cutting oxygen valve 82 as will be explained in more detail with reference to FIG. 10. The preheat oxygen shutoff valve 28 is used to close the preheat oxygen passage 76 when the torch is not in use. The preheat oxygen shutoff valve 28 is also used to regulate the flow of preheat oxygen in accordance with the requirements of the cutting nozzle used, as will be explained in relation to FIG. 10.

FIG. 6 is a schematic plan view of the passages for the controlled movement of fuel gas, preheat oxygen and cutting oxygen through the gas flow control assembly 20. As can be seen in FIG. 6, the fuel gas inlet 36 is connected by a fuel gas passage 40 to the fuel gas outlet 68. The flow control valve 42 and the fuel gas shutoff valve 30 control the flow of fuel gas through the gas flow control assembly 20, as explained above. Likewise, the common oxygen supply passage 74 receives compressed oxygen from the oxygen inlet 34 and distributes it to the preheat oxygen control valve 80 and the cutting oxygen control valve 82. Preheat oxygen passing through the preheat oxygen control valve 80 is conducted by the preheat oxygen passage 76 to the preheat oxygen shutoff valve 28 and subsequently to the preheat oxygen outlet 70. Cutting oxygen flow is controlled by the cutting oxygen control valve 82 which permits cutting oxygen to enter the cutting oxygen passage 78 only when the lever 32 (see FIG. 5) is manually depressed to an extent that it bears on the valve stem 46 of the cutting oxygen valve 82 and opens the valve against the bias of the valve spring 64. When the cutting oxygen valve 82 is open, oxygen flows through the cutting oxygen passage 78 to the cutting oxygen outlet 72.

Figure 7:
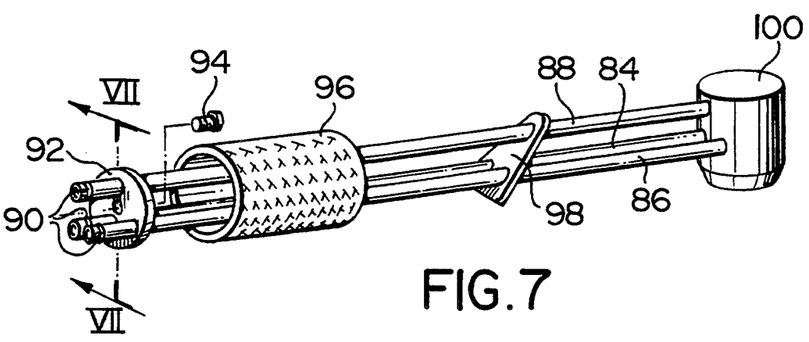
FIG. 7 is a perspective view of a torch head assembly suitable for connection to the gas flow control assembly shown in FIG. 1, the torch head assembly including a fuel gas tube, a preheat oxygen tube, a cutting oxygen tube, a mounting plate, a tubular handle, and a torch head.

FIG. 7 shows a preferred construction of a torch head assembly in accordance with the invention. The torch head assembly shown in FIG. 7 is connected to the gas flow control assembly to provide a complete cutting torch (see FIG. 10). The torch head assembly includes a fuel gas tube 84, a preheat oxygen tube 86, and a cutting oxygen tube 88. The tubes are respectively received in the fuel gas outlet 68, the preheat oxygen outlet 70, and the cutting oxygen outlet 72 (see FIG. 4). A fluid tight seal between the respective tubes and the gas outlets is insured by an O-ring 90 which fits over an end of each tube. Alternatively, the tubes 84, 86, 88 may be silver soldered into the respective outlets 68, 70, 72, in a manner well known in the art. The tubes are preferably secured to the outlet end 24 of the gas flow control assembly 20 (see FIG. 4) by a bolt 94 which passes through a bore in a mounting plate 92 and is received in a threaded bore 102 (see FIG. 4) in the outlet end 24 of the gas flow control assembly 20. The mounting plate 92 is preferably affixed to the respective tubes 84, 86, 88 using silver solder brazing. The mounting plate 92 and bolt 94 may be eliminated if the tubes 84, 86, 88 are silver soldered into the respective outlets 68, 70, 72, as described above. Each tube 84, 86, 88 is preferably a stainless steel tubing having an outside diameter of 5/16" and a 0.049" thick side wall. The length of the torch is determined by the length of the tubing 84, 86, 88. The tubing may be supplied in any practical length. Torches 8 feet in length for use in cutting wide steel slab and plate materials have been manufactured and used. When long torches are made, one or more triangular stabilizer brackets 98 are installed at spaced apart intervals along the tubing, in a manner well known in the art. Thus, very long stable torches can be provided. For torches used in areas where the torch is exposed to very high heat or other stresses, it may be desirable to run the tubes 84, 86, 88 inside a tubular sleeve (not illustrated).

Figure 7A:
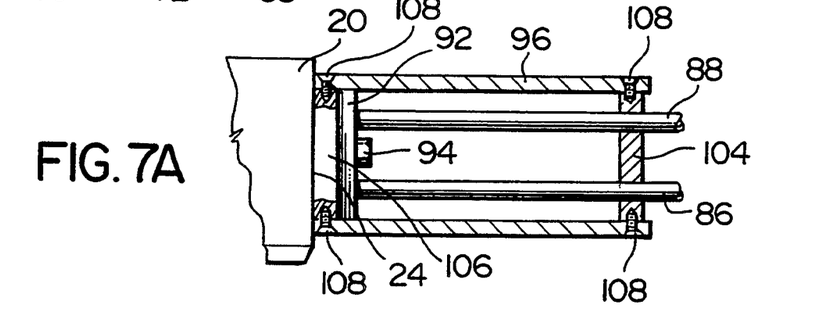
FIG. 7a, which appears on sheet 2 of the drawings, shows a cross-sectional view of a handle portion of the torch assembly taken along lines VII—VII of FIG. 7, showing the tubular handle mounted to the gas flow control assembly shown in FIG. 1.

The torch head assembly is preferably provided with a tubular handle 96, the construction of which is shown in detail of FIG. 7a. The tubular handle 96 is provided with an end plate 104 which includes bores to slidably accommodate the tubes 84, 86, 88. The end plate may be soldered to the tubular handle 96 or attached using set screws 108 in a manner well known in the art. When the torch head assembly is mounted to a gas flow control assembly 20, the tubular handle is slid forwardly over tubes 84, 86, 88 as shown in FIG. 7 and bolt 94 is installed to affix the torch head assembly to the gas flow control assembly 20. The tubular handle 96 is thereafter slid rearwardly over the mounting plate 92 and onto a flange 106 which surrounds the outlet openings 68, 70 and 72 on the outlet end 24 of the gas flow control assembly 20 (see FIG. 4). The tubular handle 96 is then affixed to the flange 106 using set screws 108, or the like, in a manner well known in the art.

Silver soldered to the outer ends of the fuel gas tube 84, the preheat oxygen tube 86 and the cutting oxygen tube 88 is what is commonly known in the art as a 90° torch head 100 (see FIG. 7). The torch head 100 is commonly constructed from brass or stainless steel.

Figure 8:
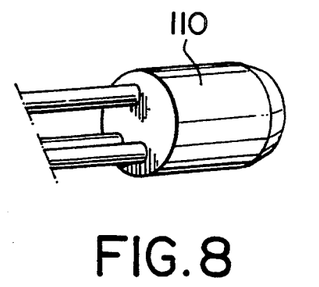
FIG. 8 shows an alternate torch head for use with the torch head assembly shown in FIG. 7.

FIG. 8 shows an alternate torch head 110 which is commonly known in the art as a 180° torch head.

Figure 9:
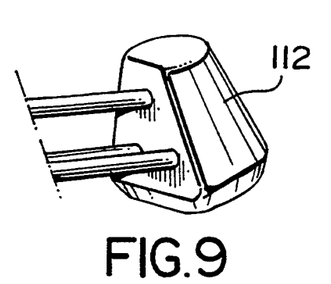
FIG. 9 shows a further alternate torch head for use with the torch head assembly shown in FIG. 7.

FIG. 9 shows another alternate torch head 112 which is commonly known in the art as a 75° torch head. Any of the torch heads 100, 110, 112, or any other suitable cutting torch head configuration may be used with the torch assembly in accordance with the invention.

Figure 10:
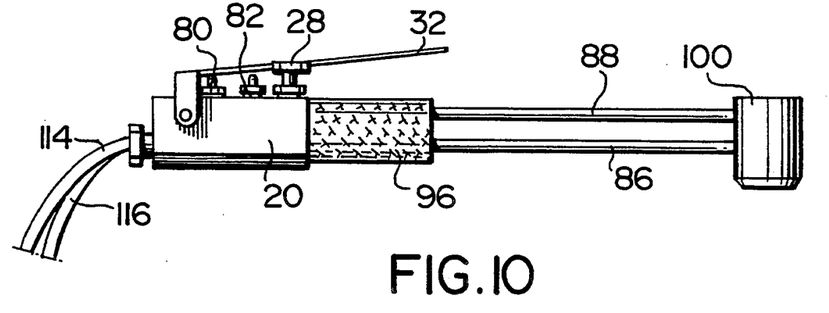
FIG. 10 shows a side elevational view of an assembled cutting torch in accordance with the invention.

FIG. 10 shows an assembled torch in accordance with the invention. The gas flow control assembly 20 is shown connected to the torch head assembly with the tubular handle 96 in the installed position. The torch includes a 90° torch head 100. Each of the torch heads shown in FIGS. 7-9 are preferably adapted to accommodate either of a premix torch nozzle and a postmix torch nozzle. Suitable premix and postmix nozzles are disclosed in the applicant's U.S. Pat. No. 5,120,026 which issued Jun. 9, 1992, the disclosure of which is incorporated herein by reference. A particularly fast cutting, efficient postmix cutting nozzle suitable for use with the torch in accordance with the invention is a postmix cutting nozzle disclosed in the applicant's co-pending U.S. patent application No. 981,352 which was filed Nov. 25, 1992, the disclosure of which is also incorporated herein by reference.

If a premix torch nozzle is to be used in a torch constructed in accordance with the invention, the fuel gas tube 84 and the preheat oxygen tube 86 are respectively restricted with pressure reducers (not illustrated), well known in the art. The pressure reducers restrict the flow of fuel gas and preheat oxygen through the tubes 84, 86 so that when the torch is operating in cutting mode and the lever 32 is released to return the torch to pilot mode, the pressure reducers permit the torch to return slowly to pilot mode. This prevents the flame from being extinguished due to a sudden drop in pressure in the premix torch nozzle.

The torch shown in FIG. 10 is operated as follows: the shutoff valises for the fuel gas the preheat oxygen 28, 30 (see FIG. 1) are respectively opened slightly, one quarter of a turn, or so. This puts the torch in pilot mode and a metered amount of fuel gas and preheat oxygen bleeds through the axial pilot bores 60 and the radial pilot bores 62 in the control valves 42, 80 (see FIGS. 3 and 5). This gas mixture is lit at the torch head 100 to produce a pilot flame. The control lever 32 is then manually operated to depress the lever to a first position which opens the fuel gas control valve 42 (see FIG. 3) and the preheat oxygen control valve 80 but does not open the cutting oxygen control valve 82. Shutoff valves 28 and 30 are adjusted while the control lever 32 is in the first position, to achieve a suitable clean burning preheat flame at the torch head 100. After the valves 28, 30 are trimmed to produce a suitable flame for preheating, the control lever 32 is released to return the torch to the pilot mode until a cutting operation is to commence. When the operator is ready to use the torch for cutting, the operator again manually depresses the control lever 32 to the first position and the torch instantly switches to the preheat mode, the trimmed preheat flame being restored at the cutting tip. The preheat flame is directed at the workpiece and the metal is heated until a molten metal pool is created where the flame contacts the workpiece. Once the molten pool is created, the lever is further manually operated to depress the lever to a second position which opens the cutting oxygen control valve 82 (see FIG. 5) and the molten metal is oxidized, effecting a cut which can be sustained with controlled movement from the torch. When the cut is completed, the control lever 32 is released and the torch returns to pilot mode. The torch therefore idles in the pilot mode when not in active use, and instantly switches to preheat or cutting mode in response to controlled manipulation of the control lever 32.

The torch in accordance with the invention has been thoroughly tested and has proven to be both reliable and safe. In particular, the torch has proven to be flashback resistant. Flashback occurs when fuel gas is mixed with oxygen inside a torch and the mixture is accidently ignited. Flashback can cause extensive damage to torch equipment and endanger personnel. Deliberate attempts to induce flashback in the torch past the flow control valves 42, 80 (see FIGS. 3 and 5) have failed. The radial pilot bores 62 are too small to sustain a flashback flame, so the flashback is extinguished at that point.

Thus, a torch is provided which may be idled in a ready condition while using very little fuel gas and compressed oxygen. The torch is instantly in full operation as soon as the control lever 32 is depressed far enough to open the preheat oxygen and the fuel gas control valves. Therefore, a torch is provided which is suitable for use in any situation where cutting is intermittent or a standby replacement torch is required. The torch has a potential for saving significant quantities of fuel gas and compressed oxygen and thereby providing significant savings in overhead for steel manufacturers, muffler repair shops, body shops, and other industries where intermittent or standby use of a cutting torch is required.

The embodiments of the invention described above are intended to be exemplary only. Changes and modifications apparent to those skilled in the art may be made without departing from the spirit or scope of the invention which is intended to be limited solely by the scope of the appended claims.

I claim:

1. A gas flow control assembly for a gas fuelled cutting torch, comprising:

a control body adapted to receive oxygen and fuel gas from separate sources and controllably meter the oxygen and fuel gas to a cutting torch head, the control body including flow control valves for respectively controlling a flow of fuel gas, preheat oxygen and cutting oxygen to the cutting torch head, each valve being biased to a normally closed position;

means for operating the flow control valves to open the valves in a specific sequence such that the valves for controlling the flow of fuel gas and preheat oxygen are opened substantially simultaneously, while the valve for controlling the flow of cutting oxygen is opened only after the fuel gas and the preheat oxygen valves are opened;

flow paths for bypassing the flow control valve for fuel gas and the flow control valve for preheat oxygen so that fuel gas and preheat oxygen are supplied to the cutting torch head when the valves are closed to sustain a pilot flame at a cutting nozzle mounted therein; and shutoff valves for selectively inhibiting a flow of fuel gas and preheat oxygen to the cutting torch head and for regulating the flow of fuel gas and preheat oxygen to the cutting torch head when the flow control valves are open.

2. A gas flow control assembly as claimed in claim 1 wherein the control body has an inlet end and an outlet end, the inlet end being adapted for the attachment of a fuel gas conduit and an oxygen conduit, and the outlet end is adapted for the attachment of a fuel gas tube, a preheat oxygen tube and a cutting oxygen tube.

3. A gas flow control assembly as claimed in claim 2 wherein the control body has passages that extend through the control body from the inlet end to the outlet end to provide fluid communication between the fuel gas conduit and the fuel gas tube, the oxygen conduit and the preheat oxygen tube, and between the oxygen conduit and the cutting oxygen tube.

4. A gas flow control assembly as claimed in claim 1 wherein the shutoff valves for inhibiting fluid flow through each of the fuel gas and the preheat oxygen passages are located between the flow control valve and the outlet end of the respective passages, each shutoff valve being operable to respectively close the passages in order to selectively inhibit the pilot mode of the torch and to regulate the preheat gas and the oxygen supply to the torch head.

5. A gas flow control assembly for a gas fuelled cutting torch as claimed in claim 3 wherein the means for biasing each flow control valve to a normally closed position comprises a coil spring associated with each valve, the coil spring acting to urge the valve to the closed position.

6. A gas flow control assembly for a gas fuelled cutting torch as claimed in claim 5 wherein each flow control valve includes a stem that extends upwardly through a fluid tight seal in a top wall of the control body.

7. A gas flow control assembly for a gas fuelled cutting torch as claimed in claim 6 wherein the means for operating the valves to open the valves in a specific sequence to selectively permit fluid flow through the respective passages comprises a lever mounted to the control body and operable to apply mechanical pressure to a top of the stems of the fluid flow control valves, the stems and the lever being arranged so that operation of the lever opens the flow control valves in the passages for the fuel gas and the preheat oxygen substantially simultaneously, and further operation of the lever applies mechanical pressure to open the fluid flow control valve in the passage for the cutting oxygen.

8. A gas flow control assembly for a gas fuelled cutting torch as claimed in claim 1 wherein the flow paths for bypassing the flow control valve for fuel gas and the flow control valve for preheat oxygen so that fuel gas and preheat oxygen are supplied to the torch head at a metered rate sufficient to permit the cutting torch to operate in a pilot mode wherein a small flame is sustained at a cutting tip installed in the torch head assembly when the flow control valves in each of the three passages are closed and the shutoff valves are open, comprises a bore of small diameter that pierces the valve body and an axial portion of the valve stem, and at least one radial bore in the valve stem that communicates with the axial bore to provide a metered flow of gas past the flow control valve.

9. An oxy/fuel cutting torch, comprising:

control valves for respectively controlling a flow of fuel gas, preheat oxygen and cutting oxygen to a torch head of the cutting torch, each control valve being biased to a normally closed position;

means for operating the valves to open the control valves in a specific sequence such that the control valves for controlling the flow of fuel gas and preheat oxygen are opened substantially simultaneously, while the control valve for controlling the flow of cutting oxygen is opened after the fuel gas and the preheat oxygen valves are opened;

flow paths for bypassing the control valve for fuel gas and the control valve for preheat oxygen so that fuel gas and preheat oxygen are supplied to the torch head when the control valves are closed, in order to sustain a pilot flame at a cutting nozzle mounted in the torch head; and shutoff valves for selectively inhibiting a flow of fuel gas and preheat oxygen to the torch head and for regulating the flow of fuel gas and preheat oxygen to the cutting torch head when the control valves are open.

10. An oxy/fuel cutting torch as claimed in claim 9 wherein the control body has an inlet end and an outlet end, the inlet end being adapted for the attachment of a fuel gas conduit and an oxygen conduit, and the outlet end is adapted for the attachment of a fuel gas tube, a preheat oxygen tube and a cutting oxygen tube.

11. An oxy/fuel cutting torch as claimed in claim 10 wherein the control body has passages that extend through the control body from the inlet end to the outlet end to provide fluid communication between the fuel gas conduit and the fuel gas tube, the oxygen conduit and the preheat oxygen tube, and between the oxygen conduit and the cutting oxygen tube.

12. An oxy/fuel cutting torch as claimed in claim 9 wherein the shutoff valves for inhibiting fluid flow through each of the fuel gas and the preheat oxygen passages are located between the flow control valve and the outlet end of the respective passages, each shutoff valve being operable to respectively close the passages in order to selectively inhibit the pilot mode of the torch and to regulate the preheat gas and the oxygen supply to the torch head.

13. An oxy/fuel cutting torch as claimed in claim 11 wherein the means for biasing each flow control valve to a normally closed position comprises a coil spring associated with each valve, the coil spring acting to urge the valve to the closed position.

14. An oxy/fuel cutting torch as claimed in claim 13 wherein each flow control valve includes a stem that extends upwardly through a fluid tight seal in a top wall of the control body.

15. An oxy/fuel cutting torch as claimed in claim 14 wherein the means for operating the valves to open the valves in a specific sequence to selectively permit fluid flow through the respective passages comprises a lever mounted to the control body and operable to apply mechanical pressure to a top of the stems of the fluid flow control valves, the stems and the lever being arranged so that operation of the lever opens the flow control valves in the passages for the fuel gas and the preheat oxygen substantially simultaneously, and further operation of the lever applies mechanical pressure to open the fluid flow control valve in the passage for the cutting oxygen.

16. An oxy/fuel cutting torch as claimed in claim 9 wherein the flow paths for bypassing the flow control valve for fuel gas and the flow control valve for preheat oxygen so that fuel gas and preheat oxygen are supplied to the torch head at a metered rate sufficient to permit the cutting torch to operate in a pilot mode wherein a small flame is sustained at a cutting tip installed in the torch head assembly when the flow control valves in each of the three passages are closed and the shutoff valves are open, comprises a bore of small diameter that pierces the valve body and an axial portion of the valve stem, and at least one radial bore in the valve stem that communicates with the axial bore to provide a metered flow of gas past the flow control valve.

17. A gas flow control assembly for a gas fuelled cutting torch, comprising:
 a control body having an inlet end and an outlet end, the inlet end being adapted for the attachment of a fuel gas conduit and an oxygen conduit, and the outlet end being adapted for the attachment of a fuel gas tube, a preheat oxygen tube, and a cutting oxygen tube for providing fluid communication of fuel gas, preheat oxygen and cutting oxygen from the control body to a cutting torch head;
 passages that extend through the control body form the inlet end to the outlet end to provide fluid communication between the fuel gas conduit and the fuel gas tube, the oxygen conduit and the preheat oxygen tube, and between the oxygen conduit and the cutting oxygen tube;
 each said passage including a flow control valve for controlling a flow of fluid therethrough, each said flow control valve including means for biasing the valve to a normally closed position so that the flow of fluid through the passage is normally inhibited;
 a restricted flow path for permitting a controlled flow of gas past the respective flow control valves in the passages for fuel gas and for preheat oxygen so that fuel gas and preheat oxygen are supplied to the torch head at a rate sufficient to permit the cutting torch to operate in a pilot mode wherein a small flame is sustained at a cutting nozzle installed in the torch head when the flow control valves in each of the respective passages are closed;
 means for operating each flow control valve against the means for biasing the valve in order to selectively open the flow control valve to permit fluid flow through the respective passages, the means for operating each flow control valve being adapted on first operation to open the flow control valves in the fuel gas and the preheat oxygen passages substantially simultaneously, and on further operation to open the flow control valve in the cutting oxygen passage; and
 a shutoff valve for inhibiting fluid flow through each of the fuel gas and the preheat oxygen passages, each shutoff valve being operable to respectively close the passages in order to selectively inhibit the pilot mode of the torch and to regulate the preheat gas and the oxygen gas supply to the torch head.

18. A gas flow control assembly for a gas fuelled cutting torch as claimed in claim 17 wherein the means for biasing each flow control valve to a normally closed position comprises a coil spring associated with each valve, the coil spring acting to urge the valve to the closed position.

19. A gas flow control assembly for a gas fuelled cutting torch as claimed in claim 18 wherein each flow control valve includes a stem that extends upwardly through a fluid tight seal in a top wall of the control body.

20. A gas flow control assembly for a gas fuelled cutting torch as claimed in claim 19 wherein the means for operating each flow control valve against its bias in order to selectively permit fluid flow through the respective passages comprises a lever pivotally mounted to the control body and operable to apply mechanical pressure to a top of the stems of the flow control valves, the stems and the lever being arranged so that a first operation of the lever applies mechanical pressure to the stems of the fuel gas and the preheat oxygen flow control valves substantially simultaneously to open the flow control valves in the passages for the fuel gas and the preheat oxygen, and further operation of the lever applies mechanical pressure to the stem of the cutting oxygen flow control valve to open the flow control valve in the passage for the cutting oxygen.

21. A gas flow control assembly for a gas fuelled cutting torch as claimed in claim 17 wherein the restricted flow path for permitting a controlled flow of gas past the respective flow control valves in the passages for fuel gas and for preheat oxygen so that fuel gas and preheat oxygen are supplied to the torch head assembly at a metered rate sufficient to permit the cutting torch to operate in a pilot mode wherein a small flame is sustained at a cutting tip installed in the torch head when the flow control valves in each of the three passages are closed and the shutoff valves are open, comprises a bore of small diameter that pierces the valve body and an axial portion of the valve stem, and at least one radial bore in the valve stem that communicates with the axial bore to provide a path for a metered flow of gas past the flow control valve.

22. A gas flow control assembly for a gas fuelled cutting torch, comprising:
 a control body having an inlet end and an outlet end, the inlet end being adapted for the attachment of at least a fuel gas conduit and one oxygen conduit, and the outlet end being adapted for the attachment of a fuel gas tube, a preheat oxygen tube, and a cutting oxygen tube for providing fluid communication of fuel gas, preheat oxygen and cutting oxygen from the control body to a torch head;

a first passage that extends through the control body form the inlet end to the outlet end to provide fluid communication between the fuel gas conduit and the fuel gas tube, and a second passage that extends through the control body from the inlet end to the outlet end to provide fluid communication between the oxygen conduit and the preheat oxygen tube and a third conduit that extends through the control body to provide fluid communication between the oxygen conduit and the cutting oxygen tube;

each said passage including a normally closed flow control valve for inhibiting a flow of fluid therethrough, each said flow control valve including a stem which extends through a fluid tight seal in a top of the control body and a means for biasing the valve to a normally closed position so that the flow of fluid through the passage is normally inhibited; a restricted flow path for permitting a controlled flow of gas past the respective flow control valves in the first and second passages so that fuel gas and preheat oxygen are supplied to the torch head at a metered rate sufficient to permit the cutting torch to operate in a pilot mode wherein a small flame is sustained at a cutting tip installed in the torch head while the flow control valves in each of the first and second passages are closed;

a lever adapted to be operated to depress the stem of each valve against the bias in order to permit fluid flow through the respective passages, the lever and the valve stems being so arranged that operation of the lever opens the valves in the first and second passages substantially simultaneously, and further operation of the lever opens the valve in the third passage; and a shutoff valve for inhibiting fluid flow through each of the first and second passages, each shutoff valve being operable to respectively close the passages in order to selectively inhibit the pilot mode of the torch and to regulate the volume of preheat gas and preheat oxygen supplied to the torch head.

23. A gas flow control assembly for a gas fuelled cutting torch as claimed in claim 22 wherein the means for biasing each flow control valve to a normally closed position comprises a coil spring associated with each valve, the coil spring urging the valve to the closed position.

24. A gas flow control assembly for a gas fuelled cutting torch as claimed in claim 22 wherein the restricted flow path for permitting a controlled flow of gas past the respective flow control valves in the passages for fuel gas and for preheat oxygen so that fuel gas and preheat oxygen are supplied to the torch head assembly at a rate sufficient to permit the cutting torch to operate in a pilot mode wherein a small flame is sustained at a cutting tip installed in the torch head assembly when the flow control valves in each of the three passages are closed and the shutoff valves are open, comprises a bore of small diameter that pierces the valve body and an axial portion of the valve stem, and at least one radial bore in the valve stem that communicates with the axial bore to provide a path for a controlled flow of gas past the flow control valve.

25. A gas fuelled cutting torch, comprising:

a control body having an inlet end and an outlet end, the inlet end being adapted for the attachment of a fuel gas conduit and at least one oxygen conduit respectively connected to a fuel gas source and an oxygen source, and the outlet end being connected to a fuel gas tube, a preheat oxygen tube, and a cutting oxygen tube for providing fluid communication of fuel gas, preheat oxygen and cutting oxygen from the control body to a torch head;

a first passage that extends through the control body form the inlet end to the outlet end to provide fluid communication between the fuel gas conduit and the fuel gas tube, a second passage that extends through the control body from the inlet end to the outlet end to provide fluid communication between the oxygen conduit and the preheat oxygen tube, and a third conduit that extends through the control body to provide fluid communication between the oxygen conduit and the cutting oxygen tube;

each said passage including a flow control valve for controlling a flow of fluid therethrough, and means for biasing the valve to a normally closed position so that the flow of fluid through the passage is normally inhibited;

a flow path for permitting a controlled flow of gas past the respective flow control valves in the first and second passages so that fuel gas and preheat oxygen are supplied to the torch head assembly at a controlled rate sufficient to permit the cutting torch to operate in a pilot mode wherein a small flame is sustained at a cutting nozzle installed in the torch head when the flow control valves in each of the three passages are closed;

means for operating each valve against the bias in order to permit fluid flow through the respective passages so that the valves in the first and second passages may be selectively opened substantially simultaneously, and further operation opens the valve in the third passage only after the valves in the first and second passages are in an open condition; and a shutoff valve for inhibiting fluid flow through each of the first and second passages, each shutoff valve being operable to respectively close the passages in order to selectively inhibit the pilot mode of the torch and to regulate the preheat operation of the torch.

26. A gas fuelled cutting torch as claimed in claim 25 wherein the means for biasing each flow control valve to a normally closed position comprises a coil spring associated with each valve, the coil spring acting to urge the valve to the closed position.

27. A gas fuelled cutting torch as claimed in claim 26 wherein each fluid flow control valve includes a stem that extends upwardly through a fluid tight seal in a top of the control body.

28. A gas fuelled cutting torch as claimed in claim 27 wherein the means for operating each valve against its bias in order to selectively permit fluid flow through the respective passages comprises a lever pivotally mounted to the control body and operable to apply mechanical pressure to a top of the stems of the flow control valves, the stems and the lever being arranged so that operation of the lever opens the fluid flow control valves in the passages for the fuel gas and the preheat oxygen substantially simultaneously, and further operation of the lever opens the fluid flow control valve in the passage for the cutting oxygen.

29. A gas fuelled cutting torch as claimed in claim 25 wherein the flow path for permitting a controlled flow of gas past the respective flow control valves in the passages for fuel gas and for preheat oxygen so that fuel gas and preheat oxygen are supplied to the torch head assembly at a rate sufficient to permit the cutting torch to operate in a pilot mode wherein a small flame is sustained at a cutting tip installed in the torch head when the flow control valves in each of the three passages are closed and the shutoff valves are open, comprises a bore of small diameter that pierces the valve body and an axial portion of the valve stem, and at least one radial bore in the valve stem that communicates with the axial bore to provide a controlled flow of gas past the flow control valve.

30. A gas fuelled cutting torch as claimed in claim 25 wherein the torch further includes a tubular handle having a first end adapted to accommodate fuel gas tube, the preheat oxygen tube and the cutting oxygen tube, the tubular handle having an opposite end adapted to attach to the outlet end of the control body.

31. A gas fuelled cutting torch as claimed in claim 30 wherein the outlet end of the control body includes a flange which extends axially from the outlet of the control body, the flange being positioned so that the opposite end of the tubular handle slidingly receives the flange, and the tubular handle is attached to the flange by screw fasteners which threadedly engage radial bores in the tubular handle and engage the flange in an intereference fit.

32. A gas fuelled cutting torch as claimed in claim 25 wherein the torch head is oriented in an axial alignment with respect to the fuel gas tube, the preheat oxygen tube and the cutting oxygen tube.

33. A gas fuelled cutting torch as claimed in claim 32 wherein the torch head is adapted to accommodate one of a premix type nozzle and a postmix type nozzle.

34. A gas fuelled cutting torch as claimed in claim 25 wherein the torch head is oriented at a right angle with respect to an axis of the fuel gas tube, the preheat oxygen tube and the cutting oxygen tube.

35. A gas fuelled cutting torch as claimed in claim 34 wherein the torch head is adapted to accommodate one of a premix type nozzle and a postmix type nozzle.

36. A gas fuelled cutting torch as claimed in claim 25 wherein the torch head is oriented at a seventy-five degree angle with respect to an axis of the fuel gas tube, the preheat oxygen tube and the cutting oxygen tube.

37. A gas fuelled cutting torch as claimed in claim 36 wherein the torch head is adapted to accommodate one of a premix type nozzle and a postmix type nozzle.

* * * * *